United States Patent
Lim et al.

(10) Patent No.: US 10,453,044 B2
(45) Date of Patent: Oct. 22, 2019

(54) OPEN PAYMENT FARE METHOD AND SYSTEM

(71) Applicant: LG CNS CO., LTD., Seoul (KR)

(72) Inventors: Seung A Lim, Seoul (KR); Yong Kyu Lee, Seoul (KR)

(73) Assignee: LG CNS CO., LTD., Seoul (KR)

( * ) Notice: Subject to any disclaimer, the term of this patent is extended or adjusted under 35 U.S.C. 154(b) by 969 days.

(21) Appl. No.: 14/288,330

(22) Filed: May 27, 2014

(65) Prior Publication Data

US 2015/0073882 A1    Mar. 12, 2015

(30) Foreign Application Priority Data

Sep. 9, 2013 (KR) .......................... 10-2013-0108005

(51) Int. Cl.
G06Q 20/00 (2012.01)
G06Q 20/14 (2012.01)
G06Q 50/30 (2012.01)
G06Q 20/40 (2012.01)
G06Q 20/08 (2012.01)
G07B 15/00 (2011.01)

(52) U.S. Cl.
CPC ....... *G06Q 20/145* (2013.01); *G06Q 20/0855* (2013.01); *G06Q 20/40* (2013.01); *G06Q 50/30* (2013.01); *G07B 15/00* (2013.01)

(58) Field of Classification Search
CPC .............. G06Q 20/145; G06Q 20/204; G06Q 20/0855; G06Q 20/40; G06Q 50/30; G07B 15/00

See application file for complete search history.

(56) References Cited

U.S. PATENT DOCUMENTS

| | | | | |
|---|---|---|---|---|
| 5,828,044 | A | * 10/1998 | Jun | G06K 7/0008 235/380 |
| 2005/0286686 | A1 | * 12/2005 | Krstulich | G06Q 30/0205 379/32.01 |
| 2007/0187491 | A1 | * 8/2007 | Godwin | G06Q 20/12 235/380 |
| 2008/0156873 | A1 | * 7/2008 | Wilhelm | G07B 15/00 235/384 |

(Continued)

FOREIGN PATENT DOCUMENTS

| | | |
|---|---|---|
| KR | 10-2000-0036744 A | 7/2000 |
| KR | 10-2006-0016570 A | 2/2006 |
| WO | WO 2006/124808 A2 | 11/2006 |

OTHER PUBLICATIONS

Zhang et. al, On Protocol-Independent Data Redundancy Elimination, Jun. 5, 2013, IEEE Communications Surveys & Tutorials vol. 16, Issue: 1, pp. 455-472) (Year: 2013).*

*Primary Examiner* — Rupangini Singh

(57) ABSTRACT

An open fare payment method for a fare payment terminal device which performs a fare transaction process, includes: receiving fare transaction information from a fare media, determining a network state between a device and a central system, and receiving an authorization result of the fare transaction information from the central system according to the network state such that the device authorizes the fare transaction information or authorizes the fare transaction information by itself independently based on authorization reference information in the fare payment terminal device.

18 Claims, 11 Drawing Sheets

(56) References Cited

U.S. PATENT DOCUMENTS

| | | | |
|---|---|---|---|
| 2009/0121016 A1* | 5/2009 | Hammad | G06Q 20/32 |
| | | | 235/382 |
| 2009/0248526 A1 | 10/2009 | Park et al. | |
| 2009/0283591 A1 | 11/2009 | Silbernagl | |
| 2011/0166995 A1 | 7/2011 | Fuerstenberg et al. | |
| 2012/0296710 A1* | 11/2012 | Dixon | G06Q 20/027 |
| | | | 705/13 |
| 2013/0311768 A1* | 11/2013 | Fosmark | G06Q 20/3223 |
| | | | 713/155 |
| 2013/0339243 A1* | 12/2013 | Dixon | G06Q 20/027 |
| | | | 705/44 |

\* cited by examiner

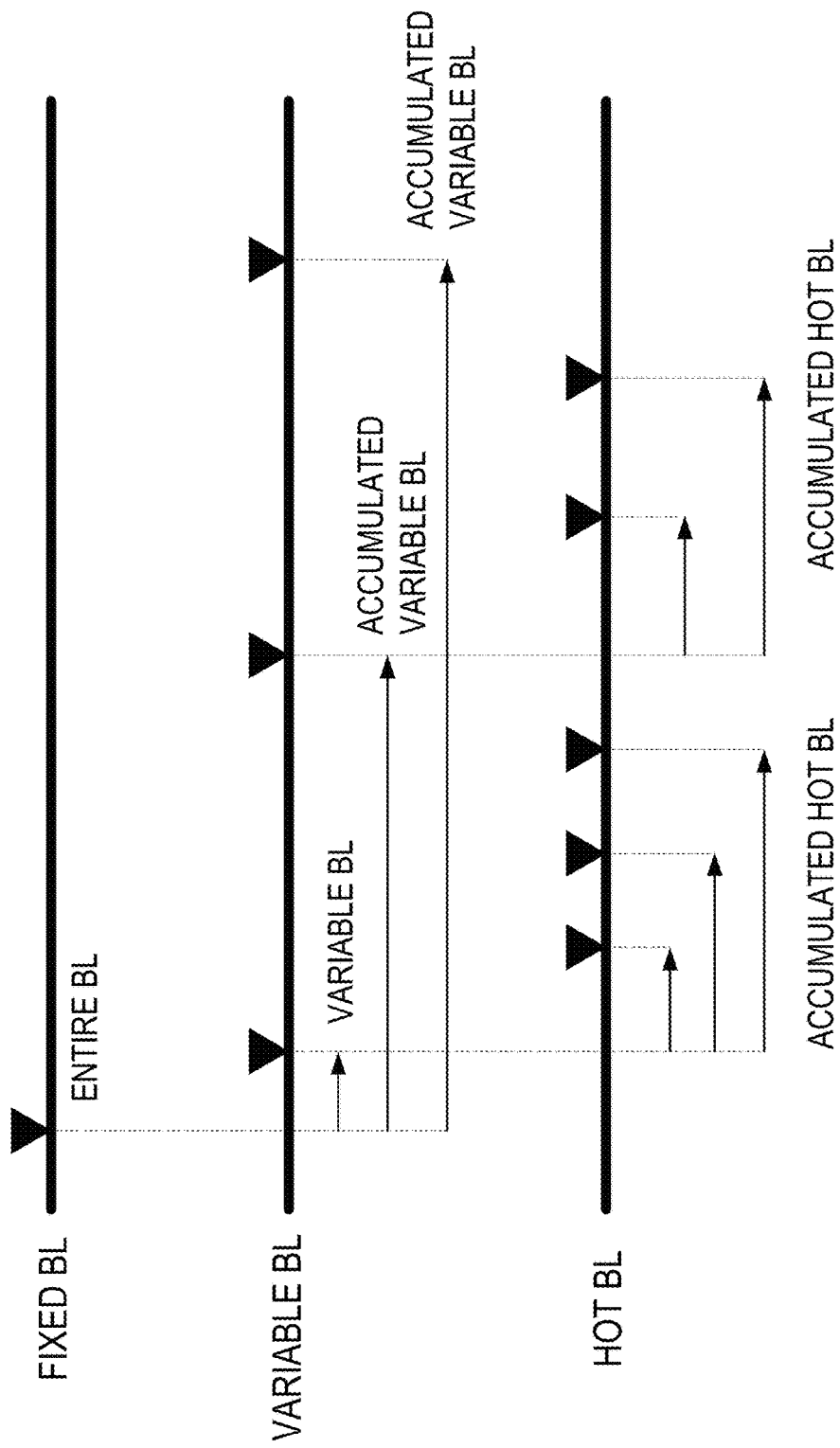

| CLASSIFICATION | DESCRIPTION | GENERATION PERIOD |
|---|---|---|
| FIXED BL | ENTIRE BL DATA | REGULARLY GENERATED AT DESIGNATED DATE |
| VARIABLE BL | BL INFORMATION ADDITIONALLY REGISTERED/CANCELED UNTIL VARIABLE BL IS GENERATED AFTER FIXED BL IS GENERATED | DAILY GENERATED |
| HOT BL | BL INFORMATION ADDITIONALLY REGISTERED/CANCELED UNTIL HOT BL IS GENERATED AFTER VARIABLE BL IS GENERATED | GENERATED AT A PERIOD IN MINUTES DEFAULT: 15 MINUTES |

FIG. 5

OPEN PAYMENT FARE METHOD AND SYSTEM

TECHNICAL FIELD OF THE INVENTION

Embodiments of the present disclosure relate to a technology for implementing an open fare payment system, and more particularly, to an open fare payment method and system in which a fare payment terminal device (hereinafter, referred to be as a "device") authorizes a fare transaction based upon information from a central system.

BACKGROUND

The background section provided herein is for the purpose of generally presenting context for the present disclosure. Work of the presently named inventors, to the extent the work is described in this section, as well as aspects of the description that may not otherwise qualify as prior art at the time of filing, are neither expressly nor impliedly admitted as prior art against the present disclosure.

In general, an automated fare collection (AFC) system performs the functions of managing a fare rate, calculating a fare, and authorizing payment. A new transaction system, referred to as an open fare payment system, performs these functions of the AFC system in real time through a central system. One aspect of the open fare payment system that is being developed and improved is the ability to perform an authorization process rapidly and securely.

The open fare payment system of the related art performs fare calculation and authorization for a customer's transaction through a central system, and the central system performs an authorization process online in real-time. Thus, the real-time fare calculation and authorization process may be influenced by the network state between a device and the central system.

In an open fare payment system using only fare media issued by a transportation authority, fare calculation and authorization processes are performed through a payment mode including the fare media, a device, and a central system. Thus, the fare calculation and authorization is relatively simple, and not significantly influenced by a network state between the device and the central system. In an open fare payment system using fare media issued by a card company or bank, however, fare calculation and authorization is relatively complex, and may be greatly influenced by a network state between the device and the central system.

SUMMARY

Embodiments of the present disclosure provide an open fare payment system and method capable of performing a transportation service for a customer by authorizing a fare transaction even when the network between a device and a central system is disconnected or offline or when the network is unstable.

Embodiments of the present disclosure provide an open fare payment system and method capable of collectively transmitting transaction information, which were processed in an abnormal state of a network, to a central system, when the network returns to a normal state.

Embodiments of the present disclosure provide an open fare payment system and method capable of transmitting blacklist information to a device from a central system in real time or at a predetermined period, in order to process a transaction when a network state is disconnected or unstable.

Embodiments of the present disclosure provide an open fare payment system and method capable of generating and managing blacklist information according to a predetermined rule, in order to enhance data processing efficiency of the network.

An embodiment of the present disclosure provides an open fare payment method for a device which performs a fare transaction process, including: receiving fare transaction information from a fare media; determining a network state between a device and a central system; and receiving an authorization result of a fare transaction from the central system according to the network state such that the device authorizes the fare transaction or authorizes the fare transaction by itself independently based on authorization reference information in the device.

An embodiment of the present disclosure provides an open fare payment method, including: receiving, at a fare payment device, fare transaction information from a fare media; determining a state of a network between the fare payment device and a central system; and determining whether or not to authorize the fare transaction based on authorization reference information in the fare payment device if the network is in a first state; and determining whether or not to authorize the fare transaction based on an authorization result of the fare transaction information received from the central system if the network is in a second state.

In an embodiment, the open fare payment method includes that the first state is an abnormal state and the second state is a normal state.

In an embodiment, the open fare payment method includes transmitting an authorization request to the central system through the network; determining whether or not a waiting time for an authorization result from the central system exceeds a predetermined time; authorizing the fare transaction based on the authorization reference information stored in the fare payment device if the waiting time exceeds the predetermined time; and authorizing the fare transaction based on the authorization result if the waiting time does not exceed the predetermined time and the authorization result is received from the central system.

In an embodiment, the open fare payment method includes receiving the authorization reference information from the central system; wherein the authorization reference information includes blacklist information; wherein the blacklist information includes fixed blacklist information, variable blacklist information, and hot blacklist information; wherein the hot blacklist information is updated in the fare payment device in real time, and the fixed blacklist information and the variable blacklist information are updated in the fare payment device at a first predetermined time period and a second predetermined time period, respectively.

In an embodiment, the open fare payment method includes determining whether or not the fare transaction information is included in the authorization reference information; rejecting the fare transaction if it is determined that the fare transaction information is included in the authorization reference information; and authorizing the fare transaction if it is determined that the fare transaction information is not included in the authorization reference information.

An embodiment of the present disclosure provides an open fare payment method for a device which performs a fare transaction process, including: receiving fare transaction information from a fare media; determining whether or not the fare transaction information is included in authorization reference information in the fare payment device; rejecting the fare transaction if the fare transaction information is included in the authorization reference information; and transmitting the fare transaction information to a central system and determining whether or not to authorize the fare transaction based on an authorization result from the central system if the fare transaction information is not included in the authorization reference information.

In an embodiment, the open fare payment method for a device which performs a fare transaction process may include: determining whether or not a state between the device and the central system is normal; transmitting an authorization request to the central system if the network state is normal; and authorizing the fare transaction based on the authorization reference information included in the device and transmitting the authorized transaction to the central system when the network returns to a normal state if the network state is abnormal.

In an embodiment, the open fare payment method for a device which performs a fare transaction process may include: determining whether or not a waiting time for the authorization result from the central system exceeds a predetermined time; authorizing the fare transaction based on authorization reference information stored in the fare payment device and transmitting the authorized transaction to the central system if the waiting time exceeds the predetermined time and the authorization result has not been received; and determining whether or not to authorize the fare transaction based on the authorization result received from the central system if the waiting time does not exceed the predetermined time and the authorization result has been received.

In an embodiment, the open fare payment method for a device which performs a fare transaction process may include: receiving authorization reference information from the central device, the authorization reference information may include blacklist information.

Another embodiment of the present disclosure provides an open fare payment method for a central system which performs a fare transaction process, including: receiving an authorization request for a fare transaction from a fare payment device, the authorization request including fare transaction information; transmitting an authorization result of the fare transaction information to the device through a network; and transmitting authorization reference information to the device.

In an embodiment, the open fare payment method for a central system which performs a fare transaction process may include: receiving authorization reference information from an acquirer system or an issuer system.

In an embodiment, the open fare payment method for a central system which performs a fare transaction process may include: transmitting an authorization request for the fare transaction to an acquirer system or an issuer system; receiving the authorization result from the acquirer system or the issuer system.

In an embodiment, the open fare payment method for a central system which performs a fare transaction process may include: receiving the authorization reference information from an acquirer system or an issuer system; and transmitting the authorization reference information at a predetermined time period to the fare payment device; generating the authorization reference information based on the fare transaction information of a fare media.

Yet another embodiment of the present disclosure provides an open fare payment method including: a real time mode in which a series of processes for authorizing a fare transaction are performed when a network state between a device and a central system is normal; and a near real time mode in which the device authorizes the fare transaction by itself independently based on authorization reference information when the network state is disconnected or unstable and transmits authorized transaction information to the central system when the network state returns to a normal state.

In an embodiment, the open fare payment method is performed in the real time mode when the network state between the device and the central system is normal, and automatically switched to the near real time mode when the network state is offline or unstable.

In an embodiment, the open fare payment method may include receiving authorization reference information from an acquirer system or an issuer system, the authorization reference information may include blacklists.

Still another embodiment of the present disclosure provides an open fare payment system including: a device configured to receive fare transaction information, authorize a fare transaction by receiving an authorization result of the fare transaction according to a network state or authorize the fare transaction by itself independently; and a central system connected to the device through the network and configured to receive an authorization request for the fare transaction information from the device through the network and transmit the authorization result to the device.

The network state may be a normal state or an abnormal state, and the open fare payment system and method may be operated in a real time mode in the normal state of the network. However, when the network between the device and the central system is disconnected or no response is received for a predetermined time, the real time mode may be automatically switched to a near-real time mode so as to authorize a transaction by the device itself, without communicating with the central system. Thus, transportation services may continue without being stopped or significantly slowed and economical risks may be minimized.

Blacklist information may be classified into a fixed blacklist, a variable blacklist, and a hot blacklist, in consideration of a network environment and data processing efficiency. Thus, the efficiency of data processing between the device and the central system may be enhanced.

BRIEF DESCRIPTION OF THE DRAWINGS

The above and other features of the present disclosure will become apparent from the following description of embodiments given in conjunction with the accompanying drawings, in which:

FIG. 4 is a diagram illustrating blacklists according to an embodiment of the present disclosure.

FIG. 5 is a table showing types of blacklists according to an embodiment of the present disclosure.

DETAILED DESCRIPTION OF EMBODIMENTS

Figure 1:
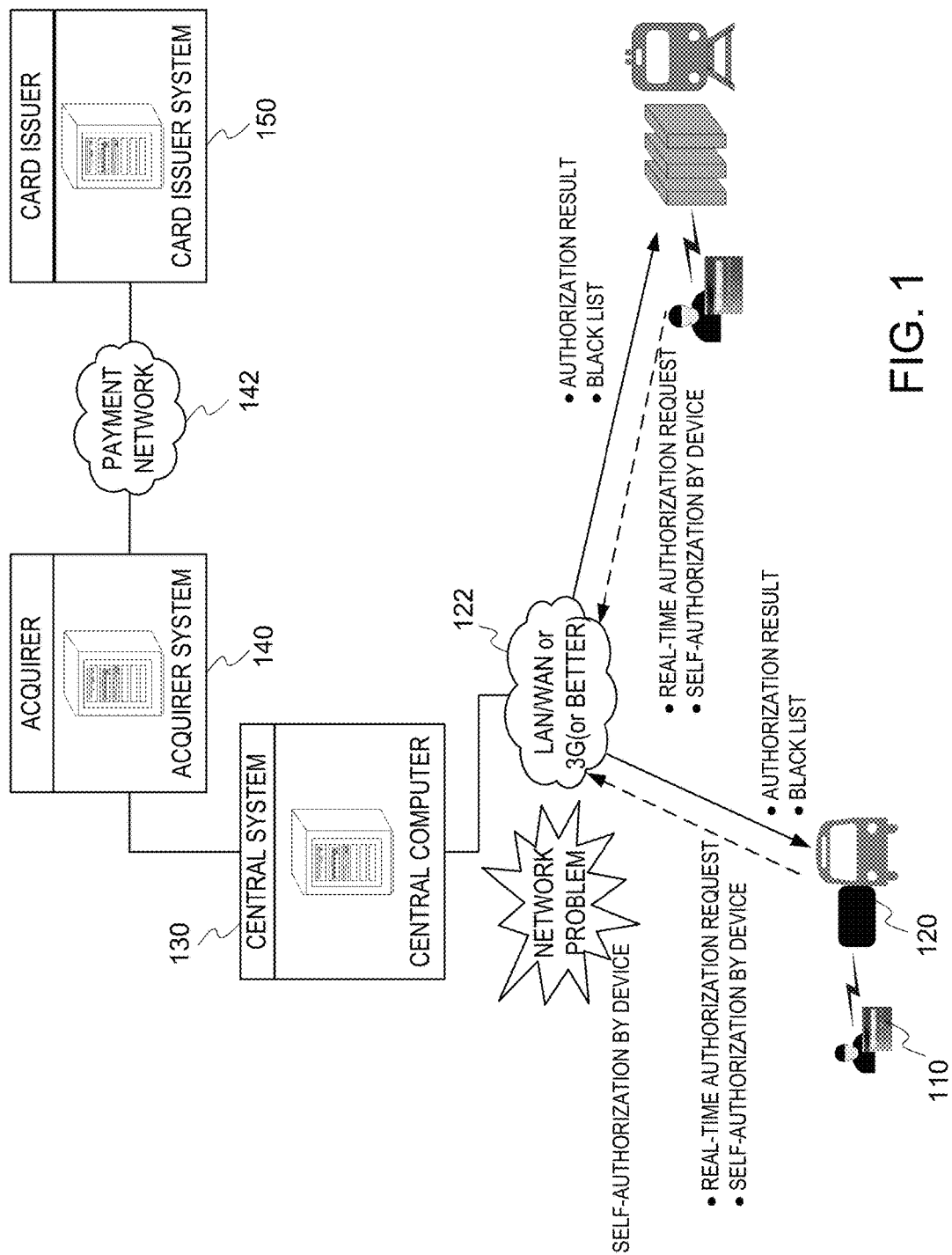
FIG. 1 is a block diagram illustrating an open fare payment system according to an embodiment of the present disclosure.

Advantages and features of the present invention will become apparent in view of the following description reference to embodiments of the present disclosure. In the present disclosure, descriptions of embodiments provide structural and functional explanations. The scope of the present invention may, however, be embodied in different forms and should not be construed as limited to the embodiments set forth herein. Rather, these embodiments are provided so that this disclosure will be thorough and complete, and will fully convey the scope of the present invention to those skilled in the art, and will be defined through the scope of claims. It will be understood that embodiments of the present invention are not limited by details of description provided herein, unless otherwise specified. Rather, embodiments of the present invention should be construed broadly within the scope defined by the appended claims. Therefore, various changes and modifications that fall within the scope of the claims, or equivalents of such scope, are therefore intended to be embraced by the appended claims. Throughout the disclosure, like reference numerals refer to like parts throughout the various figures and embodiments of the present invention.

Hereafter, an open fare payment system and method according to an embodiment of the present disclosure will be described in detail with reference to the accompanying drawings.

Referring to FIG. 1, the open fare payment system 100 according to an embodiment of the present disclosure includes fare media 110, a fare payment terminal device (hereafter, referred to as a "device") 120 configured to read fare transaction information of the fare media 110, and a fare payment server (hereafter, referred to as a "central system") 130 connected to the device 120 through a network 122 and configured to collect fare payment information from device 120 in real time, calculate transportation fares, and authorize payments. In an embodiment, the open fare payment system 100 may normally provide a transportation fare transaction service even though the network between the device and the central system is disconnected.

In an embodiment, the fare media 110 may be a contactless smart card having a specification known as EMV (Europay, Mastercard, and Visa), which is one of IC card standards, and may include various payment cards (credit, debit, and prepaid cards) issued by banks or card companies as well as those issued by a transportation authority. Each of the payment cards may be connected to an account of a card issuer or bank. In another embodiment, the fare media 110 may be a contact-type smart card or a mobile terminal such as a smart phone.

The device 120 is a reader which performs data communication with the fare media. In an embodiment, the device 120 is a terminal such as a gate installed in a transportation vehicle such as a bus or train. In another embodiment, the device 120 may be a terminal installed in a retail store. The device 120 reads information of a card or the fare media 110, transmits an authorization request to the central system 130, transmits fare transaction information from to the central system 130, receives an authorization result and authorization reference information including blacklist information, and processes a fare transaction.

The central system 130 is configured to collect transaction information from one or more of the devices 120 and calculate fares in real time. When the fare media 110 is a credit card, the central system 130 transmits an authorization request to a transaction information relay server (hereafter, referred to as an "acquirer system") 140 which will be described below, receives a result of the authorization request, and transmits a response signal to the device 120. The central system 130 also serves to manage a fare policy and blacklist information and transmits and receives the fare policy and the blacklist information.

Configurations of the device 120 and the central system 130 in accordance with an embodiment will be described with reference to FIG. 2.

Figure 2:
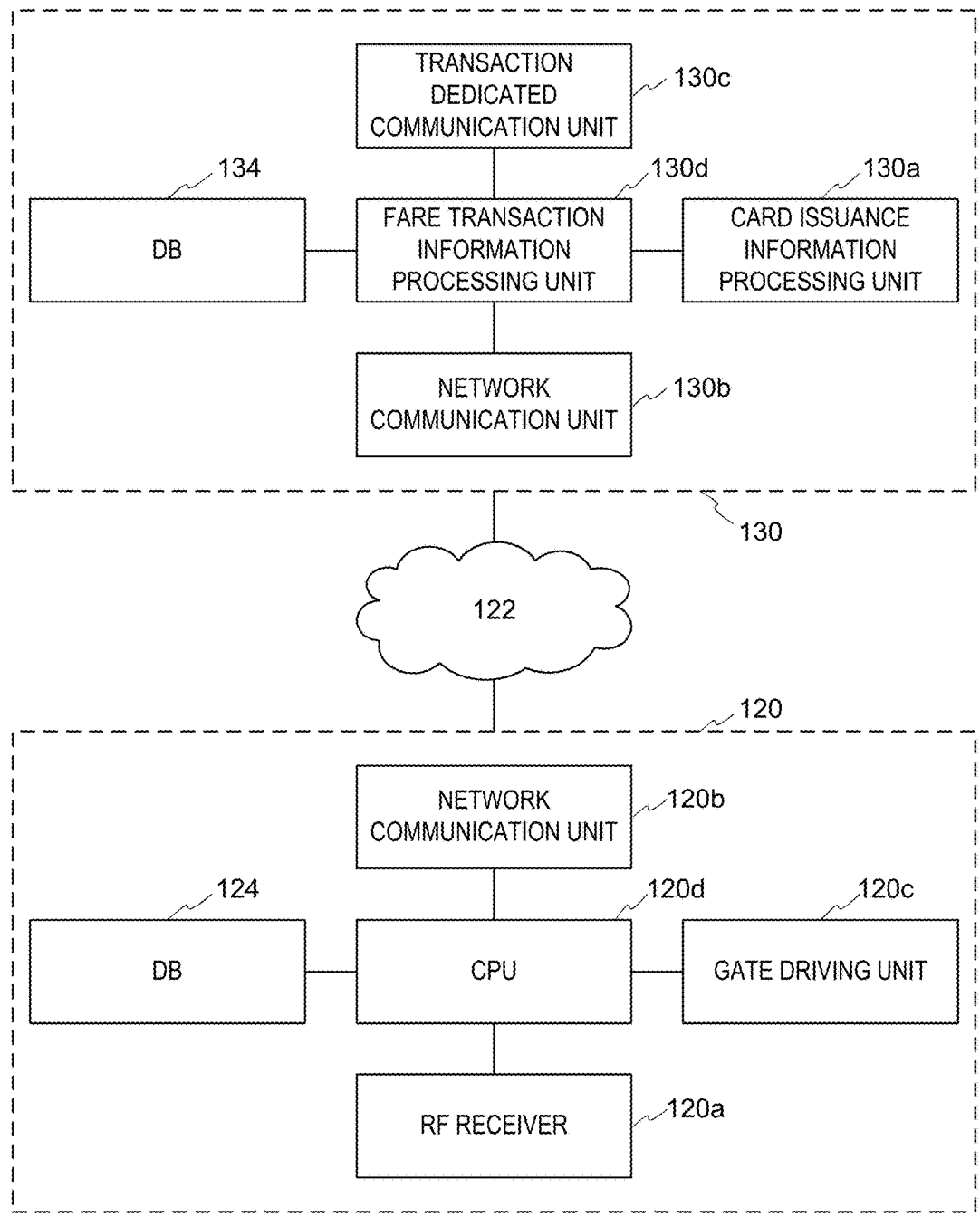
FIG. 2 is a block diagram illustrating a configuration of a device and a central system in FIG. 1.

Referring to FIG. 2, the device 120 may include an RF receiver 120a, a network communication unit 120b, a database 124, a gate driving unit 120c, and a CPU 120d. The RF receiver 120a is configured to read fare transaction information from a fare media 110, when a customer taps the fare media 110. The network communication unit 120b is configured to transmit the fare transaction information and an authorization request to the central system 130 through a network 122, and receive an authorization result and authorization reference information from the central system 130.

The database 124 is configured to store and manage the authorization reference information. The gate driving unit 120c is configured to open/close a gate or provide a boarding permission/refusal message. The CPU 120d is connected to an output terminal of the RF receiver 120a and configured to determine whether to open/close the gate or to permit/refuse boarding according to the authorization result and the authorization reference information.

The central system 130 may include a card issuance information processing unit 130a, a network communication unit 130b, a transaction dedicated communication unit 130c, a database 134, and a fare transaction information processing unit 130d. The card issuance information processing unit 130a is configured to generate and manage information related to the fare media 110 and issue a card. The network communication unit 130b is configured to receive an authorization request from the device 120, and transmit an authorization result from a transaction information management server (hereafter, referred to as an "issuer system") 150 and/or a transaction information relay server ("an acquirer system") 140, which will be described below, to the device 120 through the network 122.

The transaction dedicated communication unit 130c is configured to transmit the fare transaction information and the authorization request of the device 120 to the issuer system 150 and/or the acquirer system 140, and receive an authorization result from the systems 140 and 150. The database 134 is configured to store and manage the authorization reference information. The fare transaction information processing unit 130d is configured to process the fare transaction information of the fare media 110.

Referring back to FIG. 1, in an embodiment, the central system 130 may include any one or both of the acquirer system and the issuer system. For example, when the fare media 110 is one of the above-described various credit cards, the open fare payment system 100 according to an embodiment of the present disclosure may further include the acquirer system 140 configured to relay credit card business information and the issuer system 150 configured to manage credit card accounts.

The acquirer system 140 may be connected to the issuer system 150 through a transaction dedicated network 142 such that the fare transaction information of the fare media 110 is shared by each issuer system 150.

The acquirer system 140 serves to relay authorization information between the central system 130 and a bank or card issuer. Depending on the embodiment, the central system 130 and the issuer system 150 may be directly connected through the transaction dedicated network 142 without the relay of the acquirer system 140. In an embodiment, the acquirer system and the issuer system may be combined together.

Figure 3:
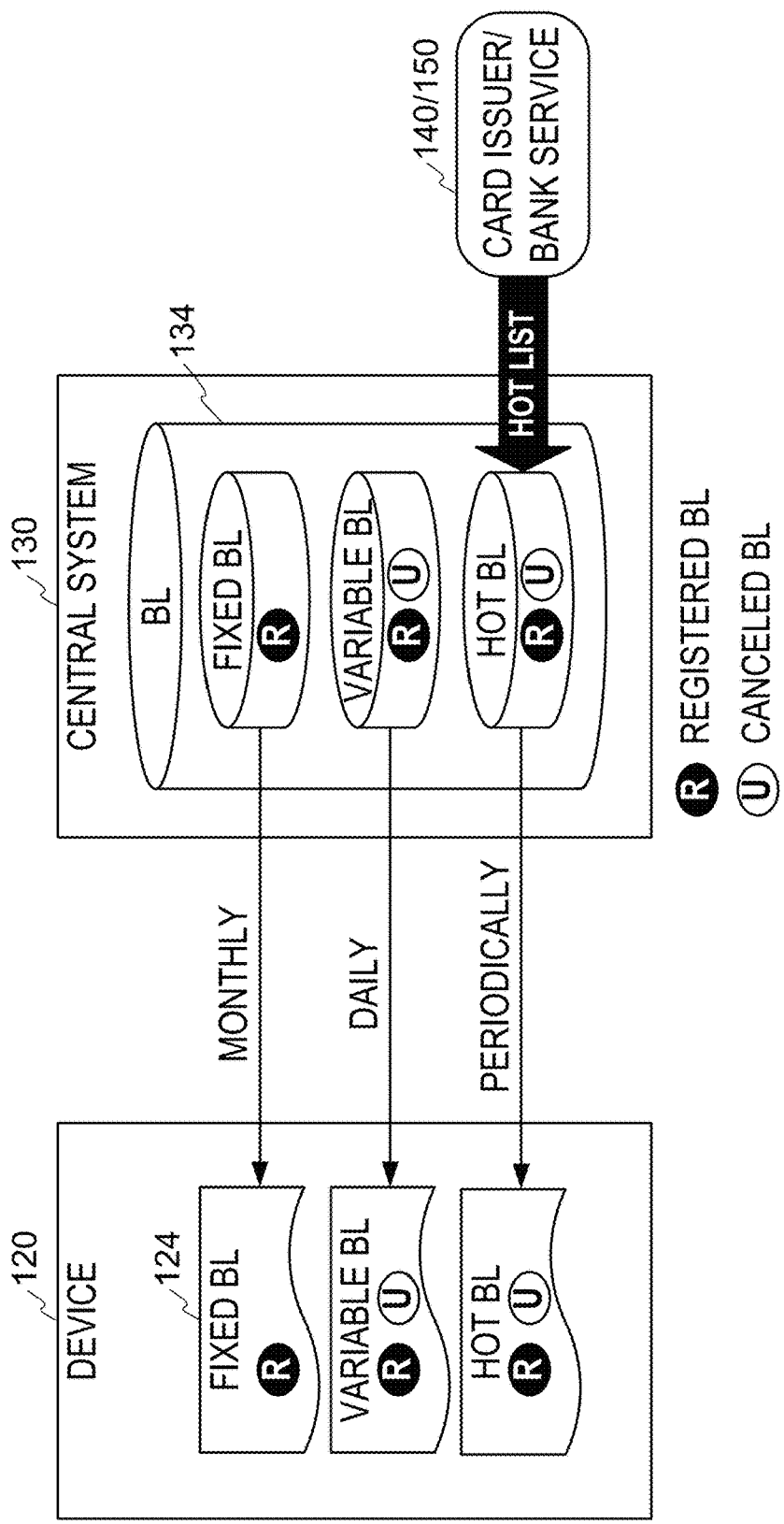
FIG. 3 is a block diagram illustrating a database of the central system according to an embodiment of the present disclosure.

Referring to FIG. 3, the issuer system 150 is configured to issue a card, manage account information of an issued card, determine whether to authorize a transaction in response to an authorization request, and transmit a response signal. Furthermore, the issuer system 150 generates, manages, and stores authorization reference information on fare media 110, including but not limited to blacklist information, and transmits the authorization reference information to the central system 130.

The authorization reference information may include blacklist information, which indicates whether a fare transaction is not authorized. Thus, for example, if fare transaction information is included in blacklist information, then a fare transaction using the fare transaction information would not be authorized.

The central system 130 immediately transmits the authorization reference information, generated through the issuer system 150 in real time, to the device 120. For example, the issuer system 150 generates hot blacklist information ("Hot BL") in real time. The issuer system 150 registers or cancels authorization reference information, such as HOT BL, in real time, based on transaction information of the fare media 110. Thus, referring to FIG. 3, the device 120 and the central system 130 have the databases 124 and 134 for storing and managing authorization reference information as described above, in order to efficiently perform a fare payment transaction.

In an embodiment, the database 134 of the central system 130 generates and stores periodic authorization reference information, including blacklist information, based on the authorization reference information generated by the issuer system in real time. Authorization reference information may be categorized by the central system 130 based on how frequently it is updated at the device 120. For example, authorization reference information may be categorized as periodic blacklist information, for example, monthly or daily blacklist information ("Monthly & Daily BL"), based on the authorization reference information generated by the issuer system in real time. In addition, the database 134 transmits the periodic authorization reference information, such as Monthly & Daily BL, to the device 120, and may store both of the periodic blacklist information (Monthly & Daily BL) and the hot blacklist information (Hot BL).

Similarly, the database 124 of the device 120 receives the authorization reference information from the central system 130 in real time and periodically receives the periodic authorization reference information at predetermined time periods. The database 124 stores the received information.

Referring to FIGS. 4 and 5, the periodic blacklist information (e.g., Monthly & Daily BL) may include fixed blacklist information (e.g., "Monthly BL"), which is updated and registered within a first time period, and variable blacklist information (e.g., "Daily BL"), which is updated, registered, and canceled within a second time period that is shorter than the first time period.

For example, as shown in the figures, the first period may be set to a monthly period, and the second period may be set to a daily period, but embodiments are not limited thereto. In other embodiments, the periods may vary from a month and a day-long period, respectively. In order to reduce the data communication load of the network 122 between the device 120 and the central system 130 and enhance data communication efficiency, the first and second periods may be set to appropriate respective time periods. The fixed blacklist information updated at the first period has only newly registered data, but the variable blacklist information updated at the second period also has canceled data. On the other hand, the hot blacklist information ("Hot BL") generated by the issuer system 150 does not have a specific period, but may be updated, registered, or canceled as soon as the information is generated.

The fixed blacklist information includes data on authorization reference information generated until a predetermined time, and may be generated at each month, for example. The variable blacklist information includes data on authorization reference information which is additionally generated after the day when the fixed blacklist information is generated, and may be generated daily. The hot blacklist information includes data on authorization reference information which is additionally generated after the day when the variable blacklist information is generated, and has no time limit.

The variable blacklist information is managed as an accumulated value of hot blacklist information generated for a predetermined time, and the fixed blacklist information is managed as an accumulated value of variable blacklist information generated for a predetermined time.

The network 122 between the device 120 and the central system 130 may be any of a LAN, WAN, 3G, 4G and the like.

In an embodiment, fare calculation and authorization in an open fare payment system 100 is performed through the central system 130 when a customer wants to pay a fare. In order to smoothly perform the open fare payment service through the central system 130, in an embodiment, a real-time online authorization process is performed when the network 122 between the device and the central system is operating normally.

However, when the network 122 between the device and the central system is unstable or temporarily disconnected, services may not be normally provided. Thus, an open fare payment system according to an embodiment of the present disclosure performs a fare payment transaction through two processes so as to stably provide services without the influence of the network communication environment.

Hereafter, an open fare payment method according to an embodiment of the present disclosure will be described with reference to the accompanying drawings.

An open fare payment method according to an embodiment of the present disclosure performs a fare payment transaction in two modes.

Figure 6:
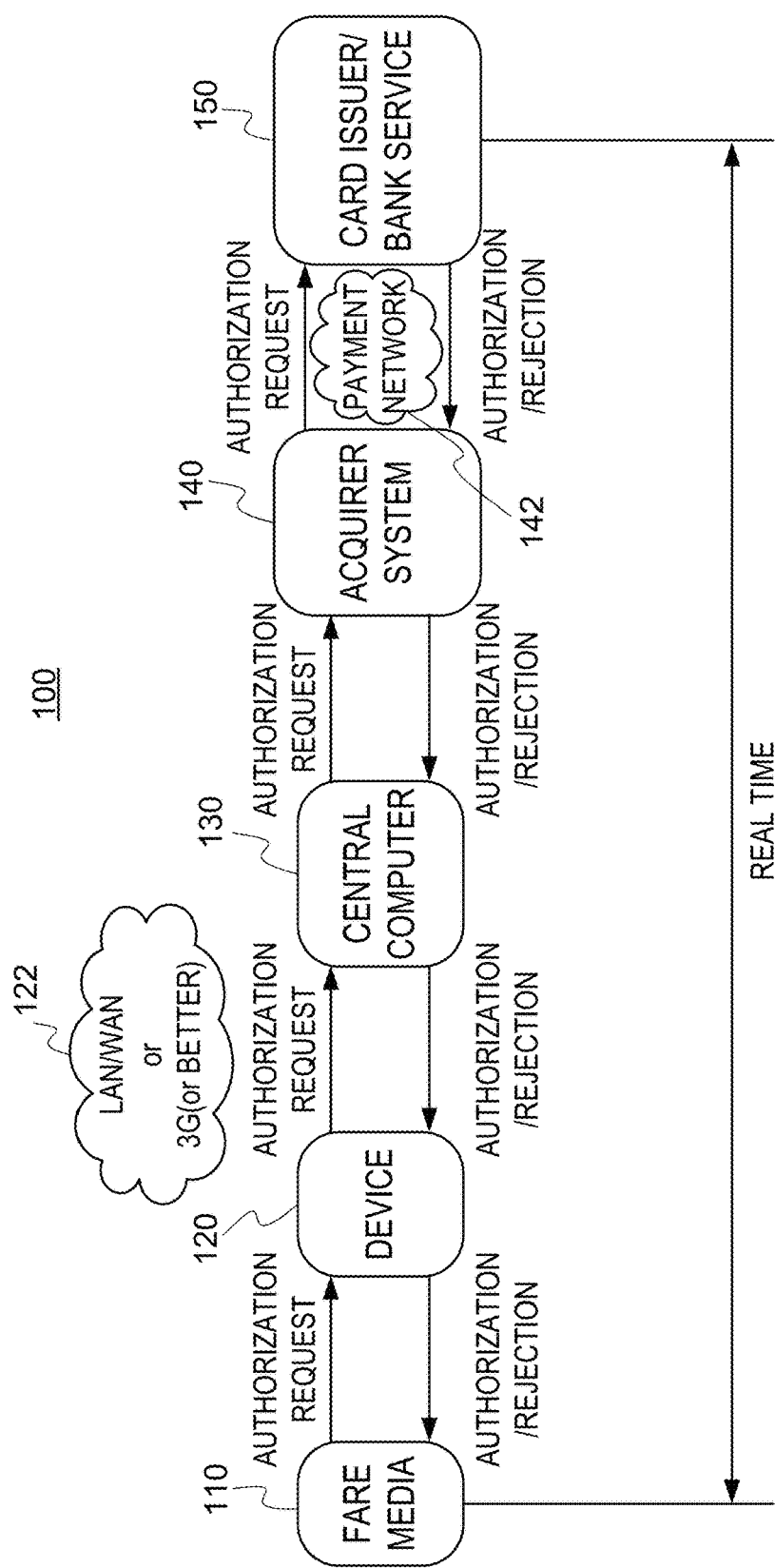
FIG. 6 is a flowchart illustrating a real time mode of an open fare payment method according to an embodiment of the present disclosure.
Figure 7:
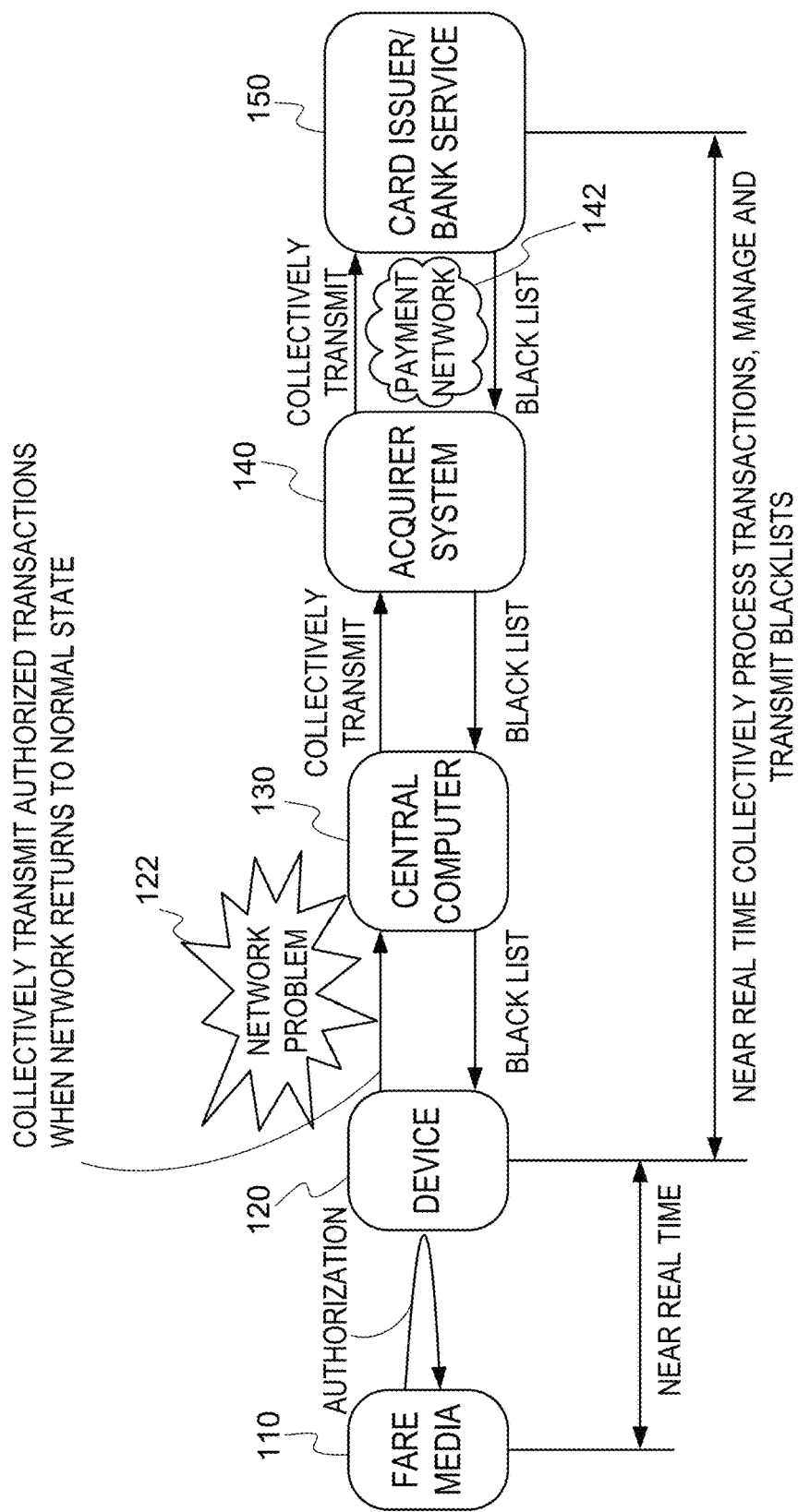
FIG. 7 is a flowchart illustrating a near real time mode of an open fare payment method according to an embodiment of the present disclosure.

Referring to FIGS. 6 and 7, a real time mode may be automatically switched to a near real time mode depending on the state of the network 122 between a device 120 and the central system 130. As a result, the open fare payment system 100 stably provides a transportation fare payment service through the central system 130. That is, in an embodiment, the open fare payment system 100 operates in a real time mode when the network 122 is in a normal state, but operates in a near real time mode when the network 122 is in an abnormal state.

The real time mode includes a process which is performed for a transportation fare payment transaction through the fare media 110, the device 120, the central system 130, the acquirer system 140, and the issuer system 150 until a response to a fare transaction authorization request is received in a normal state of the network 122. The near real time mode includes a process in which the device 120 processes a fare transaction using authorization reference information stored therein in an abnormal state of the network 122, and then transmits authorized transaction information to the central system 130 when the network 122 returns to a normal state.

Referring to FIG. 6, a real time mode is performed as a series of processes for authorizing a transaction, when the network 122 between the device and the central system is operating normally.

When a customer taps the fare media 110 on the device 120, the device 120 reads fare transaction information of the fare media 110, authenticates the validity of the fare media 110 (for example, using EMV (Europay, MasterCard and VISA) authentication), encodes the fare transaction information when the authentication is successfully completed, and transmits an authorization request to the central system 130.

The central system 130 receives the fare transaction information, decodes the received information so as to process a transaction such as payment calculation, and may transmit the authorization request to the acquirer system 140.

The acquirer system 140 receiving the fare transaction information transmits the authorization request to the issuer system 150 of a card company or bank through the transaction dedicated network 142.

The issuer system 150 checks the account of the fare media 110 and transmits authorization information to the acquirer system 140 and/or the central system 130, and the device 120 permits/rejects the transaction according to the authorization information.

As described above, the real time mode may be performed as one transaction flow until the transaction is permitted/rejected after the device 120 reads the fare transaction information of the fare media 110.

Referring to FIG. 7, the near real time mode is performed as a process in which the device 120 authorizes transactions by itself, i.e., independent of the central system 130, when the network 122 between the device and the central system is operating abnormally, and collectively transmits the authorized transactions when the network 122 between the device and the central system returns to a normal state.

When a customer taps the fare media 110 on the device 120, the device 120 reads the information of the fare media 110, authenticates the validity of the fare media 110 through a authentication process, such as EMV authentication, and checks authorization reference information, such as a blacklist information, stored therein when the authentication is successfully completed. When the fare media 110 is valid, that is, when the fare transaction information thereof is not included in the authorization reference information and thus does not belong to a blacklist, the device 120 authorizes the transaction. However, when the fare media 110 is invalid, that is, when the fare transaction information thereof is included in the authorization reference information and thus belongs to the blacklist, the device 120 rejects the transaction.

After the network 122 between the device and the central system returns to a normal state, the device 120 encodes the authorized transaction information and collectively transmits the encoded transaction information to the central system 130.

The central system 130 receives the transaction information, decodes the received transaction information so as to process a transaction, such as payment calculation, and collectively transmits the decoded transaction information to the acquirer system 140.

The acquirer system 140 receives the fare transaction information and then collectively transmits the received fare transaction information to the issuer system 150 through the transaction dedicated network 142.

The issuer system 150 checks the account of the fare media 110 and transmits an authorization result to the device 120 via the acquirer system 140 and/or the central system 130 when the fare media 110 is valid (such as, the fare transaction information thereof does not belong to the blacklist) or transmits a rejection response and a blacklist information to the device 120 when the fare media 110 is invalid (such as when the fare transaction information thereof belongs to the blacklist).

Hereafter, an open fare payment method according to an embodiment of the present disclosure will be described with reference to the accompanying drawings.

An open fare payment method according to an embodiment of the present disclosure includes reading fare transaction information of the fare media 110 when a customer taps fare media 110 on the device, determining whether the fare transaction information is included in authorization reference information (such as a blacklist), refusing the customer's boarding by rejecting the fare transaction if it is determined that the fare transaction information is included in the authorization reference information, performing network communication with the central system 130 if it is determined that the fare transaction information is not included in the authorization reference information, permitting the customer's boarding by authorizing the transaction when the network 122 between the device and the central system is operating abnormally, and transmitting an authorized transaction information when the network 122 between the device and the central system returns to a normal state.

An open fare payment method according to an embodiment of the present disclosure includes reading fare transaction information of the fare media 110 when a customer taps fare media 110 on the device 120, determining whether the fare transaction information is included in authorization reference information (such as a blacklist), refusing the customer's boarding by rejecting the fare transaction when it is determined that the fare transaction information is included in the authorization reference information, performing network communication with the central system 130 when it is determined that the fare transaction information is not included in the authorization reference information, waiting for an authorization response from the central system 130, permitting the customer's boarding by authorizing the transaction when a waiting time for response from the central system 130 exceeds a predetermined time, transmitting authorized transaction information to the central system 130, receiving an authorization/rejection message from the central system 130, refusing the customer's boarding by rejecting the transaction when a rejection message is received, and permitting the customer's boarding by authorizing the transaction when an authorization message is received.

Figure 8:
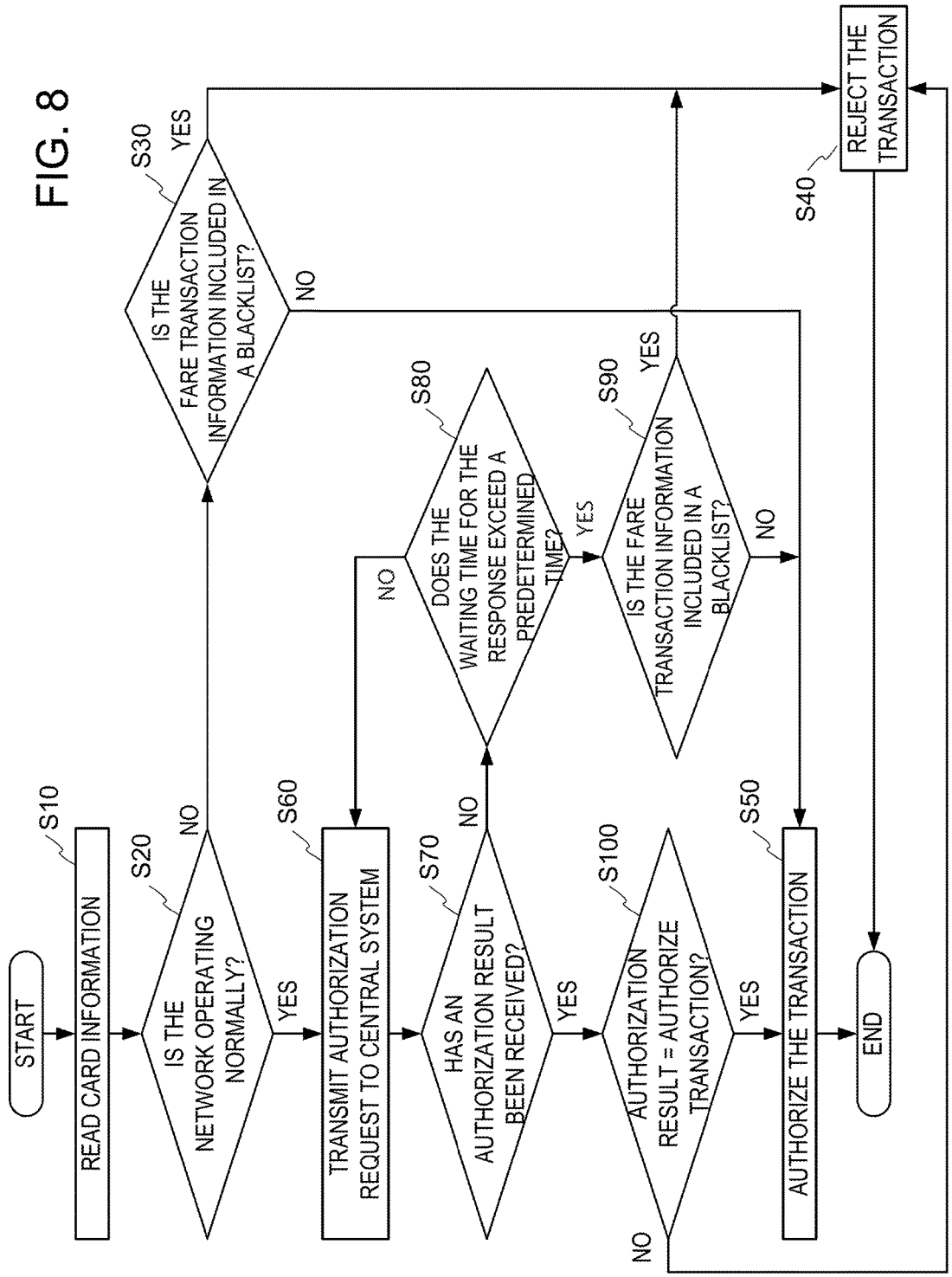
FIG. 8 is a flowchart illustrating a process of a device in an open fare payment method according to an embodiment of the present disclosure.

FIG. 8 illustrates an open fare payment method according to an embodiment. At step S10, when a customer taps fare media 110 on the device 120, the device 120 reads fare transaction information of the fare media 110.

The device 120 determines whether or not the network 122 is operating normally at step S20.

When the network 122 between the device 120 and the central system 130 is operating abnormally, the device 120 checks authorization reference information and determines whether the fare transaction information is included in authorization reference information, such as a blacklist, at step S30. If it is determined that the fare transaction information is included in the authorization reference information, the device 120 refuses the customer's boarding by rejecting the transaction at step S40.

When it is determined that the fare transaction information is not included in the authorization reference information, the device 120 permits the customer's boarding by authorizing the transaction at step S50.

Returning to step S20, when the network 122 between the device and the central system is operating normally, the device 120 transmits an authorization request to the central system at step S60.

The device 120 determines whether an authorization response from the central system 130 has been received at step S70. In an embodiment, the device 120 waits for a predetermined time before checking whether or not the authorization response has been received.

If an authorization response has not been received, the device 120 checks whether a waiting time for the response from the central system 130 exceeds a predetermined time at step S80.

If no response received within the predetermined time, the device 120 determines whether the fare transaction information is included in authorization reference information at step S90. If it is determined that the fare transaction information is included in the authorization reference information, a method in accordance with an embodiment performs step S40, and the device 120 refuses the customer's boarding by rejecting the transaction. If it is determined that the fare transaction information is not included in the authorization reference information, a method in accordance with an embodiment performs step S50, and the device 120 permits the customer's boarding by authorizing the transaction.

Returning to step S80, if the waiting time for the response does not exceed the predetermined time, the device 120 returns to step S60 and transmits an authorization request.

Returning to step S70, if the authorization response is received, the device 120 determines whether or not the authorization response authorizes the transaction, at step S100. If the authorization response does not authorize the transaction, a method in accordance with an embodiment performs step S40 and refuses the customer's boarding by rejecting the transaction. If the authorization response authorizes the transaction, a method in accordance with an embodiment performs step S50, and permits the customer's boarding by authorizing the transaction. Thus, according to the received authorization response, i.e., an authorization/rejection message, the device 120 rejects the transaction at step S40 or authorizes the transaction at step S50.

Figure 9:
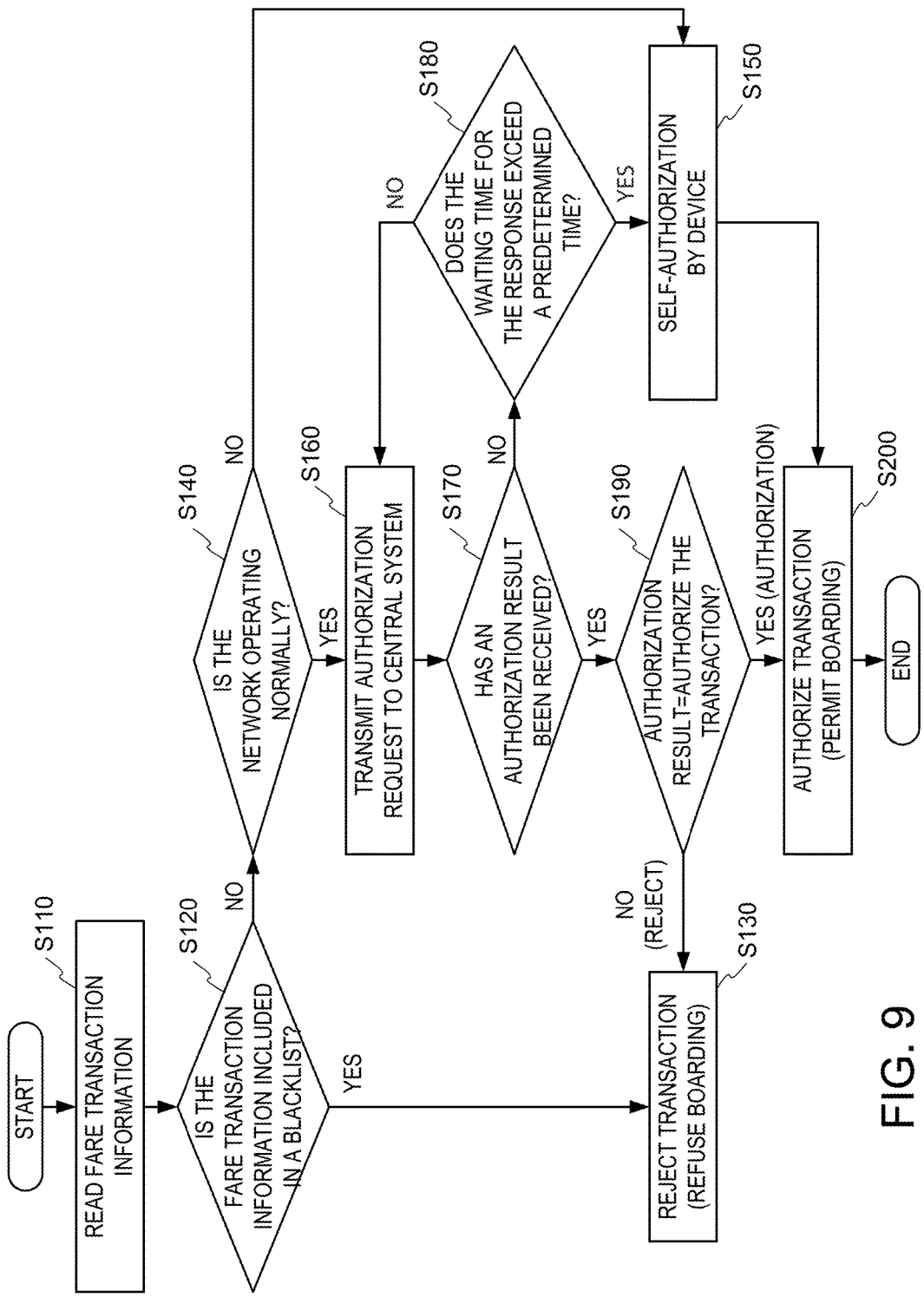
FIG. 9 is a flowchart illustrating a process of a device in an open fare payment method according to another embodiment of the present disclosure.

FIG. 9 illustrates a method of a device in an open fare payment method in accordance with another embodiment. The device 120 reads fare transaction information of the fare media 110 at step S110.

The device 120 determines whether the fare transaction information belongs to authorization reference information at step S120.

If the fare transaction information is included in to the authorization reference information, the device 120 refuses the customer's boarding by rejecting the transaction at step S130.

In an embodiment, the device 120 uses the authorization reference information to determine whether to permit the customer's boarding by authorizing the transaction by itself, i.e., without communicating with the central system 130, in order to reduce the communication load of the network between the device 120 and the central system 1300. Thus, even when the network 122 is operating abnormally, the device 120 may process the fare payment service for the customer based on the authorization reference information stored therein, without interruption of services.

In an embodiment, the device performs step S120 using authorization reference information that it receives in real time and at predetermined intervals of time. For example, the authorization reference information may include fixed blacklist information (e.g., "Monthly BL") which is updated and registered within a first time period, variable blacklist information (e.g., "Daily BL") which is updated, registered, and canceled within a second time period that is shorter than the first time period, and hot blacklist information ("Hot BL"), which is generated in real time at each customer's transaction using a fare media.

Returning to step S120, if it is determined that the fare transaction information is not included in the authorization reference information, the device 120 determines whether or not a connection can be established with the central system 130 over the network 122 in order to perform network communication with the central system 130, at step S140.

If a connection cannot be established over the network 122 between the device 120 and the central system, in an embodiment, the device determines that the network is operating abnormally, and the device 120 permits the customer's boarding by authorizing the transaction through an authorization process, at step S150.

If a connection can be established over the network 122 between the device 120 and the central system 130, in an embodiment, the device determines that the network is operating normally, and the device 120 transmits an authorization request to the central system 130, at step S160.

In an embodiment, after the authorization request is transmitted to the central system 130, the device 120 determines whether or not an authorization response has been received from the central system 130 at step S170. In an embodiment, the device 120 waits for a predetermined time before checking if an authorization response has been received. In another embodiment, the device 120 checks for the authorization response periodically.

If an authorization response is not received, the device determines whether or not a predetermined waiting time has passed at step S180. If the waiting time for the response from the central system 130 exceeds a predetermined time, the device 120 performs step S150 and permits the customer's boarding by authorizing the transaction through an authorization process.

Thus, if no response is received within the predetermined time, even though the network 122 is online, the device 120 may determine that the network state is unstable, and then authorize the transaction. In an embodiment, the waiting time for the response is an operating parameter of the device 120 and managed by the central system 130. When the waiting time is distributed as the operating parameter to the device 120 from the central system 130, the waiting time may be applied to the device 120. The waiting time for the response may be set according to business demand and the state of the network 122, and directly applied without correcting the source code.

Returning to step S170, if the device 120 receives an authorization response from the central system 130, the device 120 determines whether the authorization response is an authorization message or a rejection message, at step S190. If the authorization response is a rejection message, the device 120 performs step S130 and refuses the customer's boarding by rejecting the transaction.

If the response is an authorization message, the device 120 permits the customer's boarding by authorizing the transaction at step S200.

Figure 10:
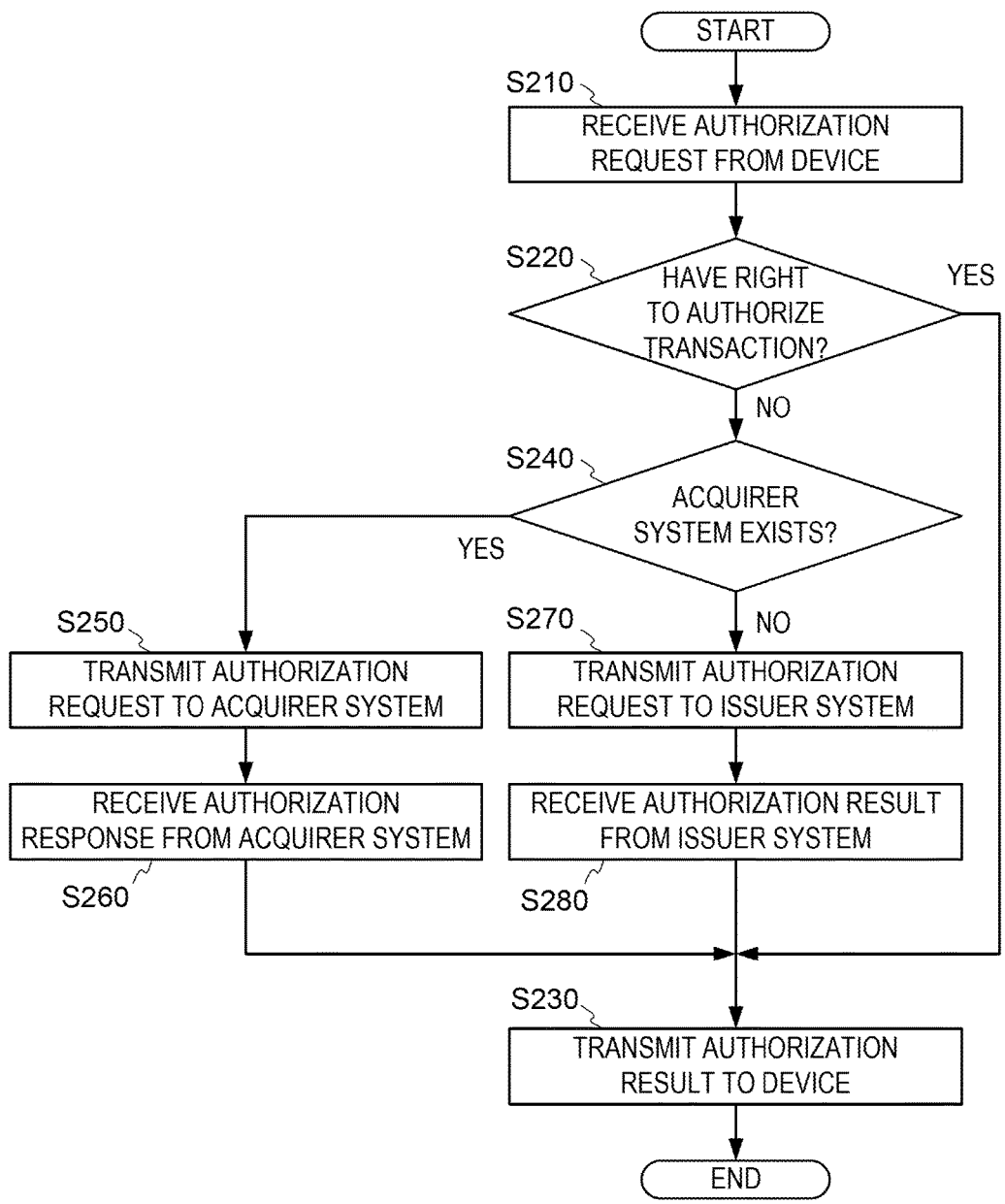
FIG. 10 is a flowchart illustrating a process of a central system in an open fare payment method according to an embodiment of the present disclosure.

FIG. 10 illustrates a process of a central system in an open fare payment method according to an embodiment of the present disclosure. The central system 130 receives an authorization request for fare transaction information from the device 120 through the network 122 at step S210.

The central system 130 determines whether the central system 130 has a right to authorize the fare transaction information from a fare media at step S220. For example, the central system 130 may have a right to authorize a fare transaction information from a transportation card issued by the transportation authorities, but may not have a right to authorize fare transaction information from a credit card or other fare media. Thus, if the fare media is a credit card, the central system 130 has a right to authorize fare transaction information if the central system 130 receives an authorization message from the issuer system 150 at step S220.

If the central system 130 has a right to authorize the fare transaction information, the central system 130 determines an authorization result, generates an authorization message or a rejection message based on the authorization result, and transmits an authorization/rejection message to the device 120 at step S230.

If the central system 130 does not have a right to authorize the fare transaction information, the central system 130 transmits an authorization request to the issuer system 150. At this time, the central system 130 first checks whether an acquirer system 140 exists at step S240.

If the acquirer system 140 exists, the central system 130 transmits the authorization request to the acquirer system 140 at step S250, receives an authorization response, i.e., an authorization/rejection message, from the acquirer system 140 at step S260, and performs step S230 of transmitting the authorization/rejection message to the device 120.

If the acquirer system 140 does not exist, the central system 130 transmits the authorization request to the issuer system 150 at step S270, receives an authorization response, i.e., an authorization/rejection message, from the issuer system 150 at step S280, and performs step S230 of transmitting the authorization/rejection message to the device 120.

Figure 11:
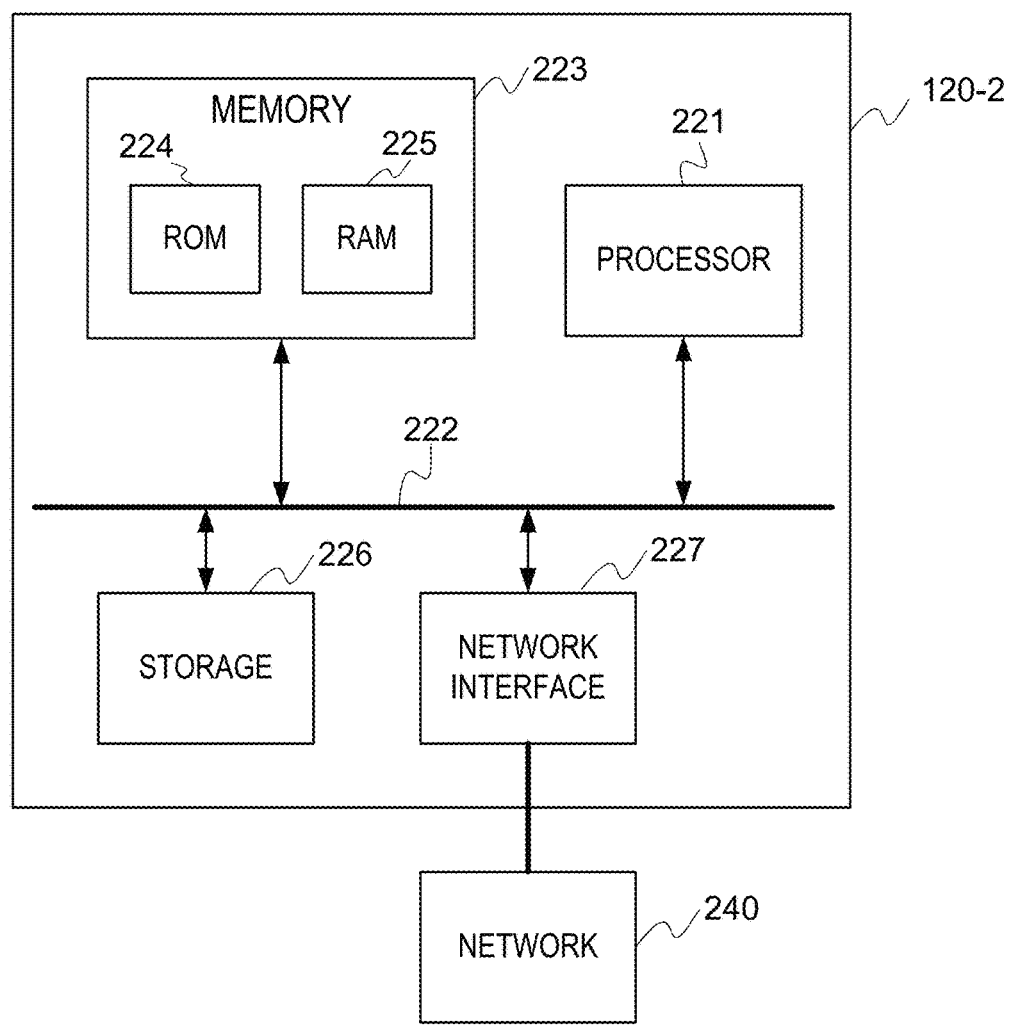
FIG. 11 is a hardware configuration of an open fare payment device according to an embodiment of the present disclosure.

FIG. 11 is a hardware configuration of an open fare payment device according to an embodiment of the present disclosure.

The device 120-2 may include a processor 221 that is in communication with a variety of other components via a bus 222. Such other components of the device 120-2 include, but are not limited to, a non-transitory computer readable storage medium as a memory 223, including a read only memory (ROM) 224 and a random access memory (RAM) 225, and also a higher capacity non-transitory computer readable storage medium 226.

One or more of these components may be employed by the device 120-2 to store computer code including instructions for an open fare payment system.

The device 120-2 also includes a network interface element 227. This network interface element 227 is configured to allow information, data, and/or signals to be transmitted between the device 120-2 and the network 122-2. Since the device 120-2 and the central system 130 are coupled to the open fare payment system via the network 122-2, such information, data, and/or signals may include the code that is executable on the devise 120-2 and/or the central system 130, data including authorization reference information from the central system 130, a fare payment transaction information to be transmitted to the central system 130, a return message, and so on.

In an embodiment, the components shown in FIG. 2 may be implemented using the components of the device 120-2 shown in FIG. 11.

As described above, an open fare payment system and method according to an embodiment may include a payment mode for fare media issued by a transportation authority using a process including a fare media, a device, and a central system, and a payment mode for fare media issued by a card company or bank using a process including the fare media, the device, the central system, the acquirer system, and the issuer system, under the supposition that the network between the device and the central system is online. An open fare payment system and method in accordance with an embodiment may provide fare transaction services in a real time mode when the network between the device and the central system is operating normally, and provide the fare transaction service based in a near real time mode when the network state between the device and the central system is disconnected or unstable or no response is received by the device for a predetermined time period.

While specific embodiments of the present disclosure have been described above, it will be apparent to those skilled in the art that various changes and modifications may be made without departing from the spirit and scope of the invention as defined in the following claims.

What is claimed is:

1. An open fare payment method of a fare payment device for an open fare payment system, the method comprising:
   receiving, by the fare payment device, fare transaction information from a fare media;
   determining, by the fare payment device, a state of a network between the fare payment device and a central system;
   receiving, by the fare payment device, authorization reference information from the central system;
   authorizing, by the fare payment device, a fare transaction based on the authorization reference information stored in the fare payment device if the network is in an abnormal state; and
   transmitting, by the fare payment device, an authorization request to the central system and determining whether or not to authorize the fare transaction based on an authorization result of the fare transaction information received from the central system if the network is in a normal state,
   wherein determining whether or not to authorize the fare transaction includes:
      determining whether or not a waiting time for the authorization result from the central system exceeds a predetermined time; and
      authorizing the fare transaction based on the authorization reference information stored in the fare payment device if the waiting time exceeds the predetermined time and the authorization result has not been received, wherein receiving the authorization reference information includes receiving fixed blacklist information at a first predetermined time period, receiving variable blacklist information at a second predetermined time period, and receiving hot blacklist information in real time, thereby updating the authorization reference information stored in the fare payment device, wherein the second predetermined time period is shorter than the first predetermined time period, and wherein the fixed blacklist information is generated by accumulating the variable blacklist information generated for the first predetermined time period, and the variable blacklist information is generated by accumulating the hot blacklist information generated for the second predetermined time period.

2. The method of claim 1, further comprising: transmitting, by the fare payment device, authorized transactions to the central system when the network returns to the normal state from the abnormal state.

3. The method of claim 1, wherein determining whether or not to authorize the fare transaction further comprises:
authorizing the fare transaction based on the authorization result if the waiting time does not exceed the predetermined time and the authorization result has been received from the central system.

4. The method of claim 1, wherein authorizing the fare transaction based on the authorization reference information comprises:
determining whether or not the fare transaction information is included in the authorization reference information;
rejecting the fare transaction if it is determined that the fare transaction information is included in the authorization reference information; and
authorizing the fare transaction if it is determined that the fare transaction information is not included in the authorization reference information.

5. The method of claim 1, wherein receiving the fixed blacklist information includes receiving the fixed blacklist information including data on authorization reference information generated during the first predetermined time period, receiving the variable blacklist information includes receiving the variable blacklist information including data on authorization reference information which is additionally generated after a time when the fixed blacklist information is generated, and receiving the hot blacklist information includes receiving the hot blacklist information including data on authorization reference information which is additionally generated after a time when the variable blacklist information is generated.

6. An open fare payment method of a fare payment device for an open fare payment system, the method comprising:
receiving, by the fare payment device, fare transaction information from a fare media;
determining, by the fare payment device, whether or not the fare transaction information is included in authorization reference information stored in the fare payment device;
rejecting, by the fare payment device, the fare transaction if the fare transaction information is included in the authorization reference information stored in the fare payment device;
determining, by the fare payment device, a state of a network between the fare payment device and a central system if the fare transaction information is not included in the authorization reference information stored in the fare payment device;
transmitting, by the fare payment device, an authorization request to the central system and determining whether or not to authorize the fare transaction based on an authorization result received from the central system if the network is in a normal state; and
authorizing, by the fare payment device, the fare transaction based on the authorization reference information stored in the device if the network is in an abnormal state and transmitting the authorized transaction to the central system when the network returns to the normal state from the abnormal state,
wherein determining whether or not to authorize the fare transaction comprises:
determining whether or not a waiting time for the authorization result from the central system exceeds a predetermined time; and
authorizing the fare transaction based on the authorization reference information stored in the fare payment device and transmitting the authorized transaction to the central system if the waiting time exceeds the predetermined time and the authorization result has not been received,
wherein the method further comprises receiving the authorization reference information,
wherein receiving the authorization reference information includes receiving fixed blacklist information at a first predetermined time period, receiving variable blacklist information at a second predetermined time period, and receiving hot blacklist information in real time, thereby updating the authorization reference information stored in the fare payment device,
wherein the second predetermined time period is shorter than the first predetermined time period, and
wherein the fixed blacklist information is generated by accumulating the variable blacklist information generated for the first predetermined time period, and the variable blacklist information is generated by accumulating the hot blacklist information generated for the second predetermined time period.

7. The method of claim 6, wherein determining whether or not to authorize the fare transaction further comprises:
if the waiting time does not exceed the predetermined time and the authorization result has been received, authorizing the fare transaction based on the authorization result received from the central system.

8. The method of claim 6, wherein receiving the fixed blacklist information includes receiving the fixed blacklist information including data on authorization reference information generated during the first predetermined time period, receiving the variable blacklist information includes receiving the variable blacklist information including data on authorization reference information which is additionally generated after a time when the fixed blacklist information is generated, and receiving the hot blacklist information includes receiving the hot blacklist information including data on authorization reference information which is additionally generated after a time when the variable blacklist information is generated.

9. An open fare payment method for an open fare payment system, the method comprising:
receiving, by a central system, an authorization request for a fare transaction from a fare payment device if a network between the fare payment device and the central system is in a normal state, the authorization request including fare transaction information of a fare media;

transmitting, by the central system, an authorization result in response to the authorization request to the fare payment device;

transmitting, by the central system, authorization reference information to the fare payment device; and receiving, by the central system, authorized transactions from the fare payment device when the network returns to the normal state from an abnormal state, wherein the fare payment device performs:

determining whether or not a waiting time for the authorization result from the central system exceeds a predetermined time after transmitting the authorization request to the central system; and authorizing the fare transaction based on the authorization reference information stored in the fare payment device and transmitting the authorized transaction to the central system if the waiting time exceeds the predetermined time and the authorization result has not been received, wherein transmitting the authorization reference information includes transmitting fixed blacklist information at a first predetermined time period, transmitting variable blacklist information at a second predetermined time period, and transmitting hot blacklist information in real time, thereby updating the authorization reference information stored in the fare payment device, wherein the second predetermined time period is shorter than the first predetermined time period, and wherein the fixed blacklist information is generated by accumulating the variable blacklist information generated for the first predetermined time period, and the variable blacklist information is generated by accumulating the hot blacklist information generated for the second predetermined time period.

10. The method of claim 9, further comprising:

transmitting, by the central system, the authorization request for the fare transaction to an acquirer system or an issuer system; and receiving, by the central system, the authorization result from the acquirer system or the issuer system.

11. The method of claim 9, further comprising:

receiving, by the central system, the authorization reference information from an acquirer system or an issuer system; and transmitting, by the central system, the authorization reference information at a predetermined time period to the fare payment device.

12. The method of claim 9, further comprising:

generating, by the central system, the authorization reference information based on the fare transaction information of the fare media.

13. The method of claim 9, wherein transmitting the fixed blacklist information includes transmitting the fixed blacklist information including data on authorization reference information generated during the first predetermined time period, transmitting the variable blacklist information includes transmitting the variable blacklist information including data on authorization reference information which is additionally generated after a time when the fixed blacklist information is generated, and transmitting the hot blacklist information includes transmitting the hot blacklist information including data on authorization reference information which is additionally generated after a time when the variable blacklist information is generated.

14. An open fare payment device, comprising:

a processor; and a non-transitory computer-readable medium having stored thereon a program that, when executed by the processor, performs a method, the method comprising:

receiving fare transaction information from a fare media;

determining a network state between the open fare payment device and a central system;

receiving authorization reference information from the central system;

authorizing a fare transaction based on the authorization reference information stored in the open fare payment device if the network is in an abnormal state; and transmitting an authorization request to the central system and determining whether or not to authorize the fare transaction based on an authorization result received from the central system if the network is in a normal state, wherein determining whether or not to authorize the fare transaction includes:

determining whether or not a waiting time for the authorization result from the central system exceeds a predetermined time; and authorizing the fare transaction based on the authorization reference information stored in the fare payment device and transmitting the authorized transaction to the central system if the waiting time exceeds the predetermined time and the authorization result has not been received, wherein receiving the authorization reference information includes receiving fixed blacklist information at a first predetermined time period, receiving variable blacklist information at a second predetermined time period, and receiving hot blacklist information in real time, thereby updating the authorization reference information stored in the fare payment device, wherein the second predetermined time period is shorter than the first predetermined time period, and wherein the fixed blacklist information is generated by accumulating the variable blacklist information generated for the first predetermined time period, and the variable blacklist information is generated by accumulating the hot blacklist information generated for the second predetermined time period.

15. The device of claim 14, wherein the method further comprises:

transmitting authorized transactions when the network returns to the normal state from the abnormal state.

16. The device of claim 14, wherein the method further comprises: receiving and storing the authorization reference information from the central system.

17. The device of claim 14, wherein determining whether or not to authorize the fare transaction further comprises:

if the waiting time does not exceed the predetermined time and the authorization result has been received, authorizing the fare transaction based on the authorization result received from the central system and transmitting the authorized transaction to the central system.

18. The device of claim 14, wherein receiving the fixed blacklist information includes receiving the fixed blacklist information including data on authorization reference information generated during the first predetermined time period, receiving the variable blacklist information includes receiving the variable blacklist information including data on authorization reference information which is additionally generated after a time when the fixed blacklist information is generated, and receiving the hot blacklist information includes receiving the hot blacklist information including data on authorization reference information which is additionally generated after a time when the variable blacklist information is generated.

\* \* \* \* \*